US009894000B2

(12) United States Patent
McCormick

(10) Patent No.: US 9,894,000 B2
(45) Date of Patent: Feb. 13, 2018

(54) METHOD FOR FORWARDING DATA PACKETS IN A NETWORK AND PROGRAMMABLE INGRESS AND EGRESS NODES THEREFORE

(71) Applicant: HUAWEI TECHNOLOGIES CO., LTD., Shenzhen (CN)

(72) Inventor: William McCormick, Ottawa (CA)

(73) Assignee: HUAWEI TECHNOLOGIES CO., LTD, Shenzhen (CN)

(*) Notice: Subject to any disclaimer, the term of this patent is extended or adjusted under 35 U.S.C. 154(b) by 105 days.

(21) Appl. No.: 14/610,673

(22) Filed: Jan. 30, 2015

(65) Prior Publication Data

US 2016/0226769 A1 Aug. 4, 2016

(51) Int. Cl.
*H04L 12/801* (2013.01)
*H04L 12/707* (2013.01)
(Continued)

(52) U.S. Cl.
CPC .............. *H04L 47/10* (2013.01); *H04L 12/54* (2013.01); *H04L 12/56* (2013.01);
(Continued)

(58) Field of Classification Search
CPC ......... H04L 12/54; H04L 29/06; H04L 45/24; H04L 47/10; H04L 12/56; H04L 12/5691;
(Continued)

(56) References Cited

U.S. PATENT DOCUMENTS 9,608,901 B2 * 3/2017 Haddad .................. H04L 45/38
2014/0119367 A1 * 5/2014 Han ..................... H04L 12/4633
370/389

(Continued)

FOREIGN PATENT DOCUMENTS

CN 102118434 A 7/2011
EP 0963082 A2 * 12/1999 ............. H04L 45/00
(Continued)

OTHER PUBLICATIONS

SIPO of the P.R. China; International Search Report and Written Opinion issued in corresponding International Application No. PCT/CN2016/071494 dated Apr. 11, 2016; 12 pages.
(Continued)

*Primary Examiner* — Jae Y Lee
*Assistant Examiner* — Jean F Voltaire
(74) *Attorney, Agent, or Firm* — Norton Rose Fulbright Canada LLP

(57) ABSTRACT

The method for forwarding a data packet in a network generally has the steps of: forming at least two transit data packets including replicating at least payload data, sequence data and destination data of the data packet; and forwarding the at least two transit data packets along different network paths. The different network paths can lead to an egress node based on the destination data. At the egress node, the received data packets can be compared to stored data to determine whether the transit data packets having the same sequence data have both been received. The received data packets can then be transmitted to the data destination only when it is determined that they are the first one of the pair of transit data packets to be received.

19 Claims, 10 Drawing Sheets

(51) Int. Cl.
*H04L 12/54* (2013.01)
*H04L 12/933* (2013.01)
*H04L 29/06* (2006.01)
*H04L 12/715* (2013.01)
*H04L 12/18* (2006.01)
*H04L 12/58* (2006.01)
*H04L 12/40* (2006.01)
*H04L 12/931* (2013.01)

(52) U.S. Cl.
CPC .... *H04L 12/5691* (2013.01); *H04L 29/06095* (2013.01); *H04L 29/06176* (2013.01); *H04L 29/06517* (2013.01); *H04L 45/24* (2013.01); *H04L 45/64* (2013.01); *H04L 47/34* (2013.01); *H04L 49/103* (2013.01); *H04L 65/601* (2013.01); *H04L 12/18* (2013.01); *H04L 12/40* (2013.01); *H04L 49/00* (2013.01); *H04L 51/00* (2013.01)

(58) Field of Classification Search
CPC ......... H04L 29/06517; H04L 29/06176; H04L 49/103; H04L 29/06095
USPC .......................................................... 370/235
See application file for complete search history.

(56) References Cited

U.S. PATENT DOCUMENTS

2014/0192645 A1* 7/2014 Zhang .................. H04L 47/12
370/235

2015/0103844 A1* 4/2015 Zhao ...................... H04L 45/42
370/410

FOREIGN PATENT DOCUMENTS

| EP | 1653639 | 1/2014 |
| EP | 2747355 A1 | 6/2014 |

OTHER PUBLICATIONS

Song, Haoyu, "Protocol-Oblivious Forwarding: Unleash the Power of SDN through a Future-Proof Forwarding Plane", Proceeding HotSDN '13 Proceedings of the second ACM SIGCOMM workshop on Hot topics in software defined networking, 2013, pp. 127-132, Association for Computing Machinery (ACM), New York, USA.

McKeown et al., "OpenFlow: Enabling Innovation in Campus Networks", Newsletter : ACM SIGCOMM Computer Communication Review, Apr. 2008, pp. 69-74, vol. 38, Issue 2, Association for Computing Machinery (ACM),New York, USA.

Elias Molina et al. Availability Improvement of Layer 2 Seamless Networks Using Openflow. Hindawi Publishing Corporation The Scientific World Journal. vol. 2015,Article ID 283165, 14 pages. XP055239668.

* cited by examiner

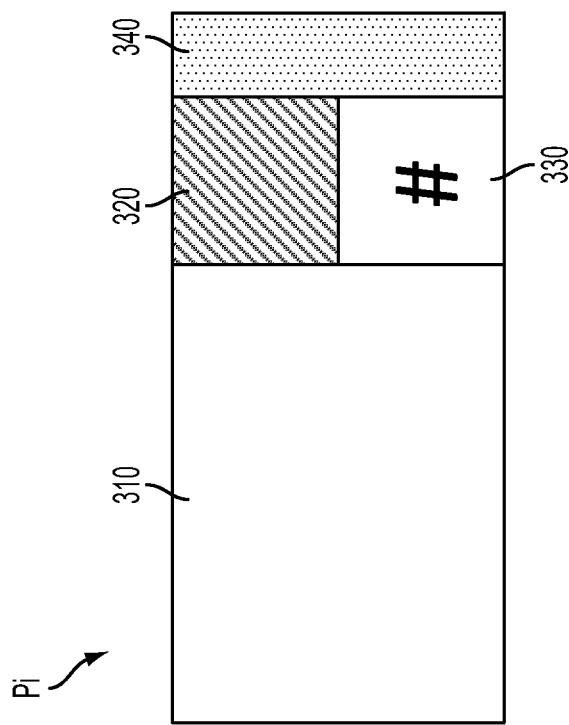
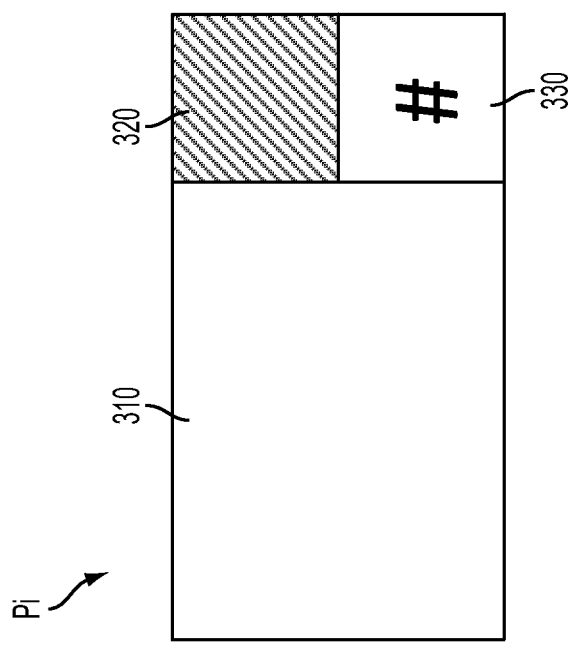

METHOD FOR FORWARDING DATA PACKETS IN A NETWORK AND PROGRAMMABLE INGRESS AND EGRESS NODES THEREFORE

FIELD

The improvements generally relate to the field of network communications, and more particularly, to systems, devices and methods for streaming data packets in a network.

BACKGROUND

Data streaming is used, for instance, when an end user desires to consume digital content as it is being provided by a service provider over a network. Such data streaming typically manages a time delay associated with downloading a sufficient portion of the digital content prior to allowing the end user to consuming it.

The digital content is typically transmitted over the network in the form of a sequence of data packets. It will be understood that loss, damage, or delay of one or more of the data packets can affect quality of the data streaming provided to the end user.

Although existing systems, devices and methods involving data streaming have been satisfactory to a certain degree, there remains room for improvement, particularly in terms of addressing issues associated with quality of the data streaming.

SUMMARY

In accordance with one aspect, there is provided a method for forwarding a data packet in a network. The method can comprise the steps of: forming at least two transit data packets including replicating at least payload data, sequence data and destination data of the data packet; transmitting a first of the at least two transit data packets along a first defined network path to an egress node selected in accordance with the destination data; and transmitting a second of the at least two transit data packets along a second defined network path to the egress node, the second defined network path being different than the first defined network path.

In accordance with another aspect, there is provided a programmable ingress node for forwarding a data packet in a network having a plurality of nodes including an egress node coupled to a data destination outside the network, the programmable ingress node for operative connection to a data source and for connection to the egress node through the network. The programmable ingress node can comprise: a processing device; and a memory operatively coupled to the processing device and having stored thereon forwarding instructions that, when executed by the processing device, cause the programmable ingress node to: form at least two transit data packets including replicating at least payload data, sequence data and destination data of the data packet; transmit a first of the at least two transit data packets along a first defined network path to an egress node selected in accordance with the destination data; and transmit a second of the at least two transit data packets along a second defined network path to the egress node, the second defined network path being different than the first defined network path.

In accordance with another aspect, there is provided a programmable egress node for connection to a network having a plurality of nodes including an ingress node coupled to a data source, the programmable egress node further for operative connection to the ingress node through the network and for forwarding a data packet to a data destination outside the network. The programmable egress node can comprise: a processing device; and a memory operatively coupled to the processing device and having stored thereon forwarding instructions that, when executed by the processing device, cause the programmable ingress node to: compare a sequence data of a received data packet to a stored sequence data of at least one previously received data packet; and forward the received data packet to the data destination when it is determined that the sequence data of the received data packet does not correspond to stored sequence data corresponding to a previously transmitted data packet.

In accordance with another aspect, there is provided a method for forwarding a data packet in a network. The method comprises the steps of forming at least two transit data packets including replicating at least payload data, sequence data and destination data of the data packet; and forwarding the at least two transit data packets along different network paths, the different network paths leading to an egress node being based on the destination data.

In accordance with another aspect, there is provided a programmable ingress node for forwarding a data packet in a network. The programmable ingress node comprises: a processing device which is operatively coupled to the network, wherein the network has at least a plurality of nodes including at least the programmable ingress node coupled to a data source and an egress node coupled to a data destination; and a memory having stored thereon first forwarding instructions being executable by the processing device. The first forwarding instructions can include forming at least two transit data packets including replicating at least payload data, sequence data and destination data of the data packet; and forwarding the at least two transit data packets along different network paths, wherein the different network paths leading to the egress node are based on the destination data.

In accordance with another aspect, there is provided a programmable egress node for forwarding a data packet in a network. The programmable egress node comprises: a processing device being operatively coupled to the network, wherein the network has at least a plurality of nodes including at least an ingress node coupled to a data source and the programmable egress node coupled to a data destination; and a memory having stored thereon second forwarding instructions executable by the processing device. The second forwarding instructions can include comparing a sequence data of a received data packet to a stored sequence data of at least one previously received data packet; and forwarding the received data packet to the data destination when it is determined that the sequence data of the received data packet does not correspond to the stored sequence data of the at least one previously received data packet.

In accordance with another aspect, there is provided a network controller for forwarding a plurality of data packets associated with a main flow in a network. The network controller includes a processing device which is operatively coupled to the network which has, in turn, at least a plurality of programmable network nodes including an ingress node coupled to a data source and an egress node coupled to a data destination. The network controller also has a memory storing a computer software product executable by the processing device. The computer software product includes computer code adapted to install first forwarding instructions on a memory of the ingress node. The first forwarding instructions are executable by a processing device of the ingress node and includes: forming at least two transit flows by replicating at least payload data, sequence data and destination data for each one of the plurality of data packets of the main flow; and forwarding the at least two transit flows along different network paths of the network, wherein the different network paths lead to the egress node based on the destination data.

Still in accordance with this latter aspect, the first forwarding instructions can include, prior to said forming and forwarding, identifying each one of the plurality of the data packets with at least one of the sequence data and the destination data.

Still in accordance with this latter aspect, said forwarding can include incorporating a different network path data to each one of the data packets of each one of the at least two transit flows, wherein the network path data of each one of the at least two transit flows can be associated with the different network paths.

Still in accordance with this latter aspect, the computer software product can include computer code to install second forwarding instructions on a memory of the egress node, wherein the second forwarding instructions can be executable by a processing device of the egress node. The second forwarding instructions can include tracking the sequence data of a received data packet; and forwarding the received data packet to the data destination based on said tracking.

Still in accordance with this latter aspect, said tracking can include comparing the sequence data of the received data packet to a stored sequence data of at least one previously received data packet; and said forwarding can be performed upon determining that the sequence data of the received data packet does not correspond to the stored sequence data of the at least one previously received data packet.

Still in accordance with this latter aspect, the network controller can be a software-defined network (SDN) controller and the plurality of programmable network nodes can be SDN nodes.

Still in accordance with this latter aspect, the plurality of programmable network nodes can be Protocol-Oblivious Forwarding (POF) switches.

Still in accordance with this latter aspect, the destination data can involve at least one of a custom protocol, a Real-time Transport Protocol (RTP) and a Transmission Control Protocol (TCP).

Still in accordance with this latter aspect, the second forwarding instructions can include deleting the stored sequence data associated with a given sequence data upon determining that the given sequence data of the received data packet corresponds to the stored sequence data of the at least one previously received data packet.

Still in accordance with this latter aspect, the second forwarding instructions can include storing the sequence data on at least one of the memory of the egress node and the memory of the network controller upon determining that the sequence data of the received data packet does not correspond to the stored sequence data of the at least one previously received data packet.

Still in accordance with this latter aspect, the computer software product can include computer code to install second forwarding instructions on a memory of the egress node, wherein the second forwarding instructions can be executable by a processing device thereof upon reception of traffic flow data from the data destination. The second forwarding instructions can include: forwarding traffic flow data to the ingress node upon reception thereof from the data destination, wherein said forwarding the traffic flow data can be performed along the different network paths.

Still in accordance with this latter aspect, the first forwarding instructions can include: forwarding the traffic flow data to the data source upon reception from the egress node.

Still in accordance with this latter aspect, the second forwarding instructions can include forwarding traffic flow data to the ingress node upon reception from the data destination, wherein said forwarding the traffic flow data can be performed along the different network paths.

Still in accordance with this latter aspect, the first forwarding instructions can include forwarding the traffic flow data from each one of the different network paths to the data source.

Still in accordance with this latter aspect, the traffic flow data from each one of the different network paths can be combined to one another prior to forwarding to the data source.

In accordance with another aspect, there is provided a method for forwarding a plurality of data packets associated with a main flow in a network. The method includes forming at least two transit flows by replicating at least payload data, sequence data and destination data for each one of the plurality of data packets of the main flow; and also forwarding the at least two transit flows along different network paths, wherein the different network paths lead to the egress node based on the destination data.

Still in accordance with this latter aspect, the method can include, prior to said forming and forwarding, identifying each one of the plurality of the data packets with at least the sequence data and the destination data.

Still in accordance with this latter aspect, said forwarding can include incorporating a different network path data to each one of the data packets of each one of the at least two transit flows, wherein the network path data of each one of the at least two transit flows can be associated with the different network paths.

Still in accordance with this latter aspect, the method can include tracking the sequence data of a received data packet; and forwarding the received data packet to the data destination based on said tracking.

Still in accordance with this latter aspect, the method can include tracking includes comparing the sequence data of the received data packet to a stored sequence data of at least one previously received data packet; wherein said forwarding can be performed upon determining that the sequence data of the received data packet does not correspond to the stored sequence data of the at least one previously received data packet.

Still in accordance with this latter aspect, the network can be a software-defined network (SDN) comprising a plurality of programmable network nodes.

Still in accordance with this latter aspect, the plurality of programmable network nodes can be Protocol-Oblivious Forwarding (POF) switches.

Still in accordance with this latter aspect, the destination data can involve at least one of a custom protocol, a Real-time Transport Protocol (RTP) and a Transmission Control Protocol (TCP).

Still in accordance with this latter aspect, the method can include deleting the stored sequence data associated with a given sequence data upon determining that the given sequence data of the received data packet corresponds to the stored sequence data of the at least one previously received data packet.

Still in accordance with this latter aspect, the method can include storing the sequence data on at least one of the memory of the egress node and the memory of the network controller upon determining that the sequence data of the received data packet does not correspond to the stored sequence data of the at least one previously received data packet.

Still in accordance with this latter aspect, the method can include forwarding traffic flow data to the ingress node upon reception thereof from the data destination, wherein said forwarding the traffic flow data can be performed along the different network paths.

Still in accordance with this latter aspect, the method can include forwarding the traffic flow data to the data source upon reception from the egress node.

Still in accordance with this latter aspect, the method can include forwarding traffic flow data to the ingress node upon reception from the data destination, wherein said forwarding the traffic flow data can be performed along the different network paths.

Still in accordance with this latter aspect, the method can include forwarding the traffic flow data from each one of the different network paths to the data source.

Still in accordance with this latter aspect, the traffic flow data from each one of the different network paths can be combined to one another prior to forwarding to the data source.

In accordance with another aspect, there is provided a computer software product which can be used for forwarding a plurality of data packets associated with a main flow in a network. The computer software product can be storable on a memory of a network controller associated with the network and can be adapted to perform, when installed on a memory of an ingress node of the network, the first forwarding instructions. The first forwarding instructions are executable by a processing device of the ingress node, and include: forming at least two transit flows by replicating at least payload data, sequence data and destination data for each one of the plurality of data packets of the main flow; and forwarding the at least two transit flows along different network paths, wherein the different network paths lead to an egress node based on the destination data.

Still in accordance with this latter aspect, the first forwarding instructions can include, prior to said forming and forwarding, identifying each one of the plurality of the data packets with at least the sequence data and the destination data.

Still in accordance with this latter aspect, said forwarding can include incorporating a different network path data to each one of the data packets of each one of the at least two transit flows, wherein the network path data of each one of the at least two transit flows can be associated with the different network paths.

Still in accordance with this latter aspect, the computer software product can include second forwarding instructions to be installed on a memory of the egress node of the network, wherein the second forwarding instructions can be executable by a processing device of the egress node. The second forwarding instructions can include tracking the sequence data of a received data packet; and forwarding the received data packet to the data destination based on said tracking.

Still in accordance with this latter aspect, the tracking can include comparing the sequence data of the received data packet to a stored sequence data of at least one previously received data packet, and said forwarding can be performed upon determining that the sequence data of the received data packet does not correspond to the stored sequence data of the at least one previously received data packet.

Still in accordance with this latter aspect, the network controller can be a software-defined network (SDN) controller and the plurality of programmable network nodes can be SDN nodes.

Still in accordance with this latter aspect, the plurality of programmable network nodes can be Protocol-Oblivious Forwarding (POF) switches.

Still in accordance with this latter aspect, the destination data can involve at least one of a custom protocol, a Real-time Transport Protocol (RTP) and a Transmission Control Protocol (TCP).

Still in accordance with this latter aspect, the second forwarding instructions can include deleting the stored sequence data associated with a given sequence data upon determining that the given sequence data of the received data packet corresponds to the stored sequence data of the at least one previously received data packet.

Still in accordance with this latter aspect, the sequence data can be stored on at least one of the memory of the egress node and the memory of the network controller.

Still in accordance with this latter aspect, the computer software product can include computer code to install second forwarding instructions on a memory of the egress node, the second forwarding instructions can be executable by a processing device thereof upon reception of traffic flow data from the data destination. The second forwarding instructions can include forwarding traffic flow data to the ingress node upon reception thereof from the data destination, wherein said forwarding the traffic flow data can be performed along the different network paths.

Still in accordance with this latter aspect, the first forwarding instructions can include forwarding the traffic flow data to the data source upon reception from the egress node.

Still in accordance with this latter aspect, the second forwarding instructions can include forwarding traffic flow data to the ingress node upon reception from the data destination, wherein said forwarding the traffic flow data can be performed along the different network paths.

Still in accordance with this latter aspect, the first forwarding instructions can include forwarding the traffic flow data from each one of the different network paths to the data source.

Still in accordance with this latter aspect, the traffic flow data from each one of the different network paths can be combined to one another prior to forwarding to the data source.

In accordance with another aspect, there is provided a programmable ingress node for forwarding a plurality of data packets associated with a main flow in a network. The programmable ingress node includes a processing device which is operatively coupled to the network which has, in turn, at least a plurality of nodes including at least the programmable ingress node coupled to a data source and an egress node coupled to a data destination. The programmable ingress node also has a memory having stored thereon first forwarding instructions being executable by the processing device. The first forwarding instructions include: forming at least two transit flows including replicating at least payload data, sequence data and destination data for each one of the plurality of data packets of the main flow; and forwarding the at least two transit flows along different network paths, wherein the different network paths lead to the egress node based on the destination data.

Still in accordance with this latter aspect, the first forwarding instructions can include, prior to said forming and forwarding, identifying each one of the plurality of the data packets with at least the sequence data and the destination data.

Still in accordance with this latter aspect, said forwarding can include incorporating a different network path data to each one of the data packets of each one of the at least two transit flows, wherein the network path data of each one of the at least two transit flows can be associated with the different network paths.

Still in accordance with this latter aspect, the network can be a software-defined network (SDN).

Still in accordance with this latter aspect, the programmable ingress node can be a SDN switch.

Still in accordance with this latter aspect, the SDN switch is at least one of OpenFlow switch and a Protocol-Oblivious Forwarding (POF) switch.

Still in accordance with this latter aspect, the destination data can involve at least one of a custom protocol, a Real-time Transport Protocol (RTP) and a Transmission Control Protocol (TCP).

Still in accordance with this latter aspect, the programmable ingress node can include comprising computer code to install second forwarding instructions on a memory of the egress node, wherein the second forwarding instructions can be executable by a processing device thereof upon reception of traffic flow data from the data destination. The second forwarding instructions can include forwarding traffic flow data to the ingress node upon reception thereof from the data destination, wherein said forwarding the traffic flow data can be performed along the different network paths.

Still in accordance with this latter aspect, the first forwarding instructions can include: forwarding the traffic flow data to the data source upon reception from the egress node.

In accordance with another aspect, there is provided a programmable egress node for forwarding a plurality of data packets associated with a main flow in a network. The programmable egress node has a processing device being operatively coupled to the network which has, in turn, at least a plurality of nodes including at least an ingress node coupled to a data source and the programmable egress node coupled to a data destination. The programmable egress node also has a memory having stored thereon second forwarding instructions executable by the processing device. The second forwarding instructions include: comparing a sequence data of a received data packet to a stored sequence data of at least one previously received data packet; and forwarding the received data packet to the data destination when it is determined that the sequence data of the received data packet does not correspond to the stored sequence data of the at least one previously received data packet.

Still in accordance with this latter aspect, the second forwarding instructions can include deleting the stored sequence data associated with a given sequence data upon determining that the given sequence data of the received data packet corresponds to the stored sequence data of the at least one previously received data packet.

Still in accordance with this latter aspect, the sequence data can be stored on at least one of the memory of the egress node and the memory of the network controller.

Still in accordance with this latter aspect, the network can be a software-defined network (SDN).

Still in accordance with this latter aspect, the programmable ingress node can be a SDN switch.

Still in accordance with this latter aspect, the SDN switch can be at least one of OpenFlow switch and a Protocol-Oblivious Forwarding (POF) switch.

Still in accordance with this latter aspect, the second forwarding instructions can include forwarding traffic flow data to the ingress node upon reception from the data destination, wherein said forwarding the traffic flow data can be performed along the different network paths.

Still in accordance with this latter aspect, the first forwarding instructions can include forwarding the traffic flow data from each one of the different network paths to the data source.

Still in accordance with this latter aspect, the traffic flow data from each one of the different network paths can be combined to one another prior to forwarding to the data source.

In accordance with another aspect, there is provided a network communication system for forwarding a plurality of data packets associated with a main flow in a network. The network communication system has a programmable ingress node operatively coupled to the data source and to the network. The programmable ingress node is configured to receive a request to forward the main flow having the plurality of data packets from a data source to a data destination, wherein said forwarding the main flow include: forming at least two transit flows by replicating at least payload data, sequence data and destination data for each one of the plurality of data packets of the main flow; and forwarding the at least two transit flows along different network paths. Wherein the different network paths lead to the egress node based on the destination data. The network communication system also has a programmable egress node operatively coupled to the data destination and to the network. The programmable egress node is configured to receive the at least two transit flows, wherein said reception include: tracking the sequence data of a received data packet; and forwarding the received data packet to the data destination based on said tracking.

Still in accordance with this latter aspect, the first forwarding instructions can include, prior to said forming and forwarding, identifying each one of the plurality of the data packets with at least the sequence data and the destination data.

Still in accordance with this latter aspect, said forwarding can include incorporating a different network path data to each one of the data packets of each one of the at least two transit flows, wherein the network path data of each one of the at least two transit flows can be associated with the different network paths.

Still in accordance with this latter aspect, said tracking can include comparing the sequence data of the received data packet to a stored sequence data of the at least one previously received data packet; and wherein said forwarding the received data packet can be performed upon determining that the sequence data of the received data packet does not correspond to the stored sequence data of the at least one previously received data packet.

Still in accordance with this latter aspect, the network controller can be a software-defined network (SDN) controller and the plurality of programmable network nodes can be SDN nodes.

Still in accordance with this latter aspect, the plurality of programmable network nodes can be Protocol-Oblivious Forwarding (POF) switches.

Still in accordance with this latter aspect, the destination data can involve at least one of a custom protocol, a Real-time Transport Protocol (RTP) and a Transmission Control Protocol (TCP).

Still in accordance with this latter aspect, the second forwarding instructions can include deleting the stored sequence data associated with a given sequence data upon determining that the given sequence data of the received data packet corresponds to the stored sequence data of the at least one previously received data packet.

Still in accordance with this latter aspect, the sequence data can be stored on at least one of the memory of the egress node and the memory of the network controller.

Still in accordance with this latter aspect, the computer software product can include computer code to install second forwarding instructions on a memory of the egress node, wherein the second forwarding instructions can be executable by a processing device thereof upon reception of traffic flow data from the data destination. The second forwarding instructions can include forwarding traffic flow data to the ingress node upon reception thereof from the data destination, wherein said forwarding the traffic flow data can be performed along the different network paths.

Still in accordance with this latter aspect, the first forwarding instructions can include forwarding the traffic flow data to the data source upon reception from the egress node.

Still in accordance with this latter aspect, the second forwarding instructions can include forwarding traffic flow data to the ingress node upon reception from the data destination, wherein said forwarding the traffic flow data can be performed along the different network paths.

Still in accordance with this latter aspect, the first forwarding instructions can include forwarding the traffic flow data from each one of the different network paths to the data source.

Still in accordance with this latter aspect, the traffic flow data from each one of the different network paths can be combined from one another prior to forwarding to the data source.

Many further features and combinations thereof concerning the present improvements will appear to those skilled in the art following a reading of the instant disclosure.

DESCRIPTION OF THE FIGURES

In the figures,

FIG. 3A is a high-level schematic diagram showing a first example of a data packet, in accordance with an embodiment;

FIG. 3B is a high-level schematic diagram showing a second example of a data packet, in accordance with an embodiment;

These drawings depict exemplary embodiments for illustrative purposes, and variations, alternative configurations, alternative components and modifications may be made to these exemplary embodiments.

DETAILED DESCRIPTION

Figure 1:
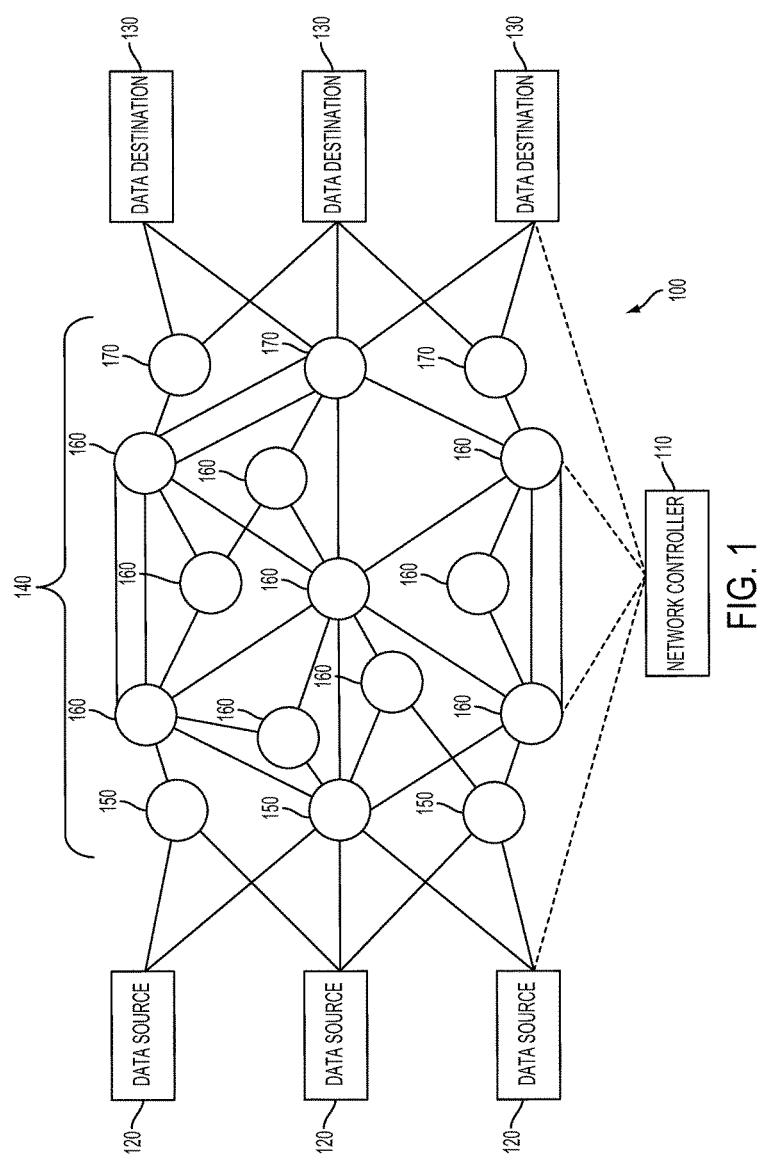
FIG. 1 is a network diagram of an example of a network communication system, in accordance with an embodiment.

FIG. 1 illustrates an example of a network communication system 100. As depicted, the system 100 includes a network controller 110, data sources or stream source 120, and data destinations or stream processing facilities 130, interconnected by a packet-switched network 140. The packet-switched network 140 includes nodes such as ingress nodes 150, intermediate nodes 160 and egress nodes 170.

In this embodiment, the network communication system 100 has a partially or a fully software-defined architecture. The network controller 110 is a software-defined network (SDN) controller which can be coupled with suitable application program interfaces (APIs). The SDN controller 110 is configured to perform control plane functions for packet-switched network 140 and to perform traffic engineering functions for the network 140. For example, the network controller 110 determines optimal network paths for flow of data packets transmitted in the network 140, and schedules departure times of the data packets at nodes of system 110. Moreover, in this embodiment, nodes 150, 160 and 170 are programmable network nodes such as SDN nodes, SDN switches and the like. Nodes 150, 160 and 170 are configured to be programmable and/or controllable via the network controller 110 or via third-party devices. Such programmability of the network controller 110 and of the nodes 150, 160 and 170 allows for customization of both the control and forwarding planes of the SDN system 100.

Example methods and systems presented herein are embodied in SDN systems 100 which involve streaming of information over the network 140. While harnessing the advantages associated with SDN systems 100, network controllers 110 and nodes 150, 160 and 170, embodiments disclosed herein involve duplicating a stream of data to address data streaming quality issues such as those which can result from lost, damaged and/or delayed data packets. Addressing such challenges in non-SDN communication systems involved hardware physically integrated at the ingress node and at the egress node such which was costly in terms of additional physical equipment, maintenance and human resources, and at least some of such concerns can be addressed using an SDN embodiment as disclosed herein.

Figure 2:
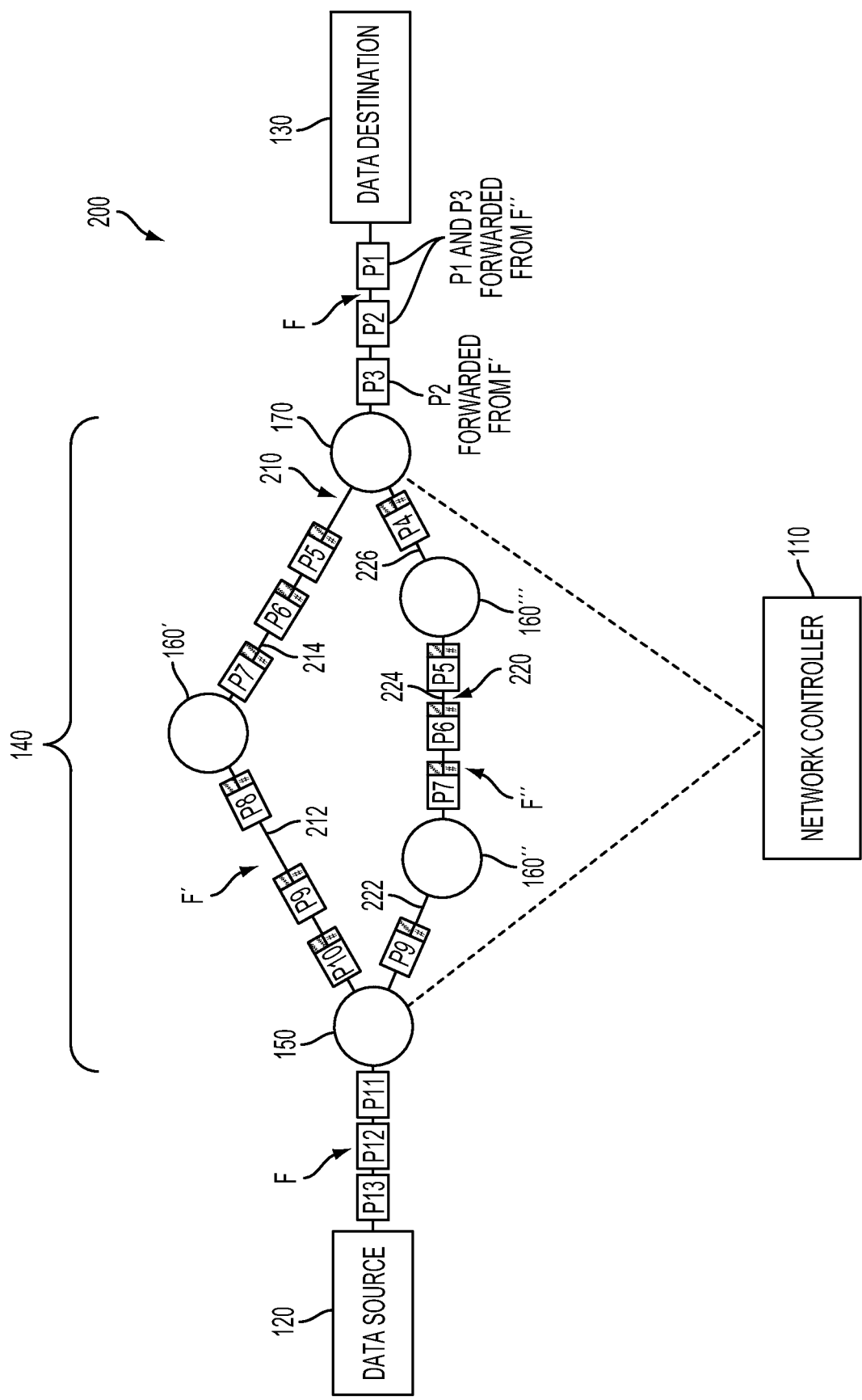
FIG. 2 is a schematic diagram showing a first example of a main flow of data packets in the network communication system of FIG. 1, in accordance with an embodiment.

FIG. 2 illustrates a schematic diagram showing a first example of a main flow F of data packets Pi in the network communication system 100. As briefly described above, in data streaming, digital content is transmitted (also referred to as "forwarded") over the network 140 in the form of the main flow F having a sequence of a plurality of data packets Pi. The main flow F is transmitted from the data source 120, for instance. This embodiment involves use of software at, and/or network control of, the ingress node 150 and the egress node 170. At the ingress node 150, the data packets Pi of the main flow F are replicated into two transit flows F' and F" of replicated data packets Pi. The transit flows F', F"

are then transmitted over the network 140 along different network paths, and more specifically a first of the at least two transit data packets if forwarded along a first defined network path 210 to an egress node and a second of the at least two transit data packets is forwarded along a second defined network path 220 to the egress node, the second defined network path 220 being different than the first defined network path 210. Further, at the egress node 170, upon reception of the transit flows F', F'', the data packets Pi are tracked and forwarded to the data destination 130. Compared to sending a single transit flow, this embodiment can significantly reduce the likelihood of any given one of the same data packets Pi be lost, damaged and/or delayed. Tracking of the received data packets Pi can be based on sequence data of each one of the receiving data packets. In an embodiment, the methods and systems described herein allow for, during said tracking, keeping a record of stored sequence data indicative of which one of the data packets of the sequence thereof has already been forwarded to the data destination 130. As detailed herein, the at least two different network paths can be selected in accordance with destination data and lead to the egress node based on the destination data.

In the simplified, exemplary schematic presented in FIG. 2, the network 140 has a plurality of network paths which couple the remotely disposed data source 120 and data destination 130. The transit flow F' is transmitted over the network 140 via the network path 210 so that data packets Pi of the transit flow F' are transmitted along a first network link 212 to the intermediate node 160', and then to the egress node 170 via a second network link 242. Also shown in this embodiment, the transit flow F''' is transmitted to the egress node 170 over the network path 220 which has intermediate nodes 160'' and 160''' and networks links 222, 224 and 226.

As it is schematically illustrated in FIG. 2, some data packets Pi are lost, damaged and/or delayed. For instance, data packet P4 of transit flow F' and data packet P8 of transit flow F''' are lost and/or missing and data packet P9 of transit flow F' is temporally delayed compared to data packet P8. The methods and systems disclosed herein can provide a main flow F at the data destination 130 with less compromise on the quality of the data streaming. Indeed, at the moment illustrated in FIG. 2, data packets P1, P2 and P3 of the main flow F were just tracked and compared by the egress node 170 and are about to be forwarded to the data destination 130. In this embodiment, data packets P1 and P2 were selected from flow F''' while data packet P3 was selected from flow F'. Upcoming towards the egress node 170 is data packet P4 from transit flow F''' which, since the data packet P4 is absent from transit flow F', is going to be forwarded to the data destination 130. In the context where the data packets Pi of any one of the transit flows can be used on the main flow F transmitted to the data destination 130, both the transit flows can be said to be active, and the embodiment can be referred to as an example of active-active data streaming.

FIG. 3A is a high-level schematic diagram showing a first example of the data packet Pi. In this embodiment, the data packet Pi includes payload data 310, destination data 320 and sequence data 330 (additional data can be present in alternate embodiments). The payload data 310 is associated with segmented digital content to be streamed over the network 140. In an embodiment, the amount of information contained in the payload data 310 is equally shared among the data packets of the flow, while in another embodiment, the amount of information contained in the payload 310 can vary from one data packet to another. The destination data 320 is associated with the data destination 130 where the main flow F is to be ultimately forwarded to. In this embodiment, the detailed network path is not entirely determined at the ingress node, but is determined at least partially at intermediate nodes, and can thus depend on the current network conditions and/or any other relevant consideration. The sequence data 330 associated to the data packet Pi is indicative of its sequential order within the main flow F. For instance, in the embodiment of FIG. 2, data packet P1 is the first data packet of the main flow F while the data packet Pi is the i-th data packet of the main flow F.

FIG. 3B is a high-level schematic diagram showing a second example of the data packet Pi. In this embodiment, the data packet Pi additionally includes a more detailed network path data 340 pertaining to intermediate destination(s) along the path leading ultimately to the egress node. In one embodiment, for instance, the entire path can be predetermined and indicated in the network path data 340 at the stage of the ingress node, for instance. The network path can include a specific sequence of nodes and/or links to follow within the network 140. In another embodiment, the network path data can be indicative of a subsequent intermediate node 160 where the data packet Pi is to be forwarded to.

The data 320, 330, (and 340 or any other additional data) incorporated to the data packet Pi can be provided in the form of a header which can be read by a given communication protocols. The destination data 320 can be an Internet protocol (IP) header, an User Datagram Protocol (UDP) header, a Real-time Transport Protocol (RTP) header, or the like, for instance. The sequence data can be a numerical value indicative of a sequence order of the data packet Pi within the main flow F or any other header which can fulfill sequencing functions. Moreover, it was found useful in SDN environments to provide destination data 320 which are customized instead of being associated with known communication protocols. Indeed, the need for respecting standard protocols is reduced since the nodes 150, 160 and 170 are programmable.

Figure 4:
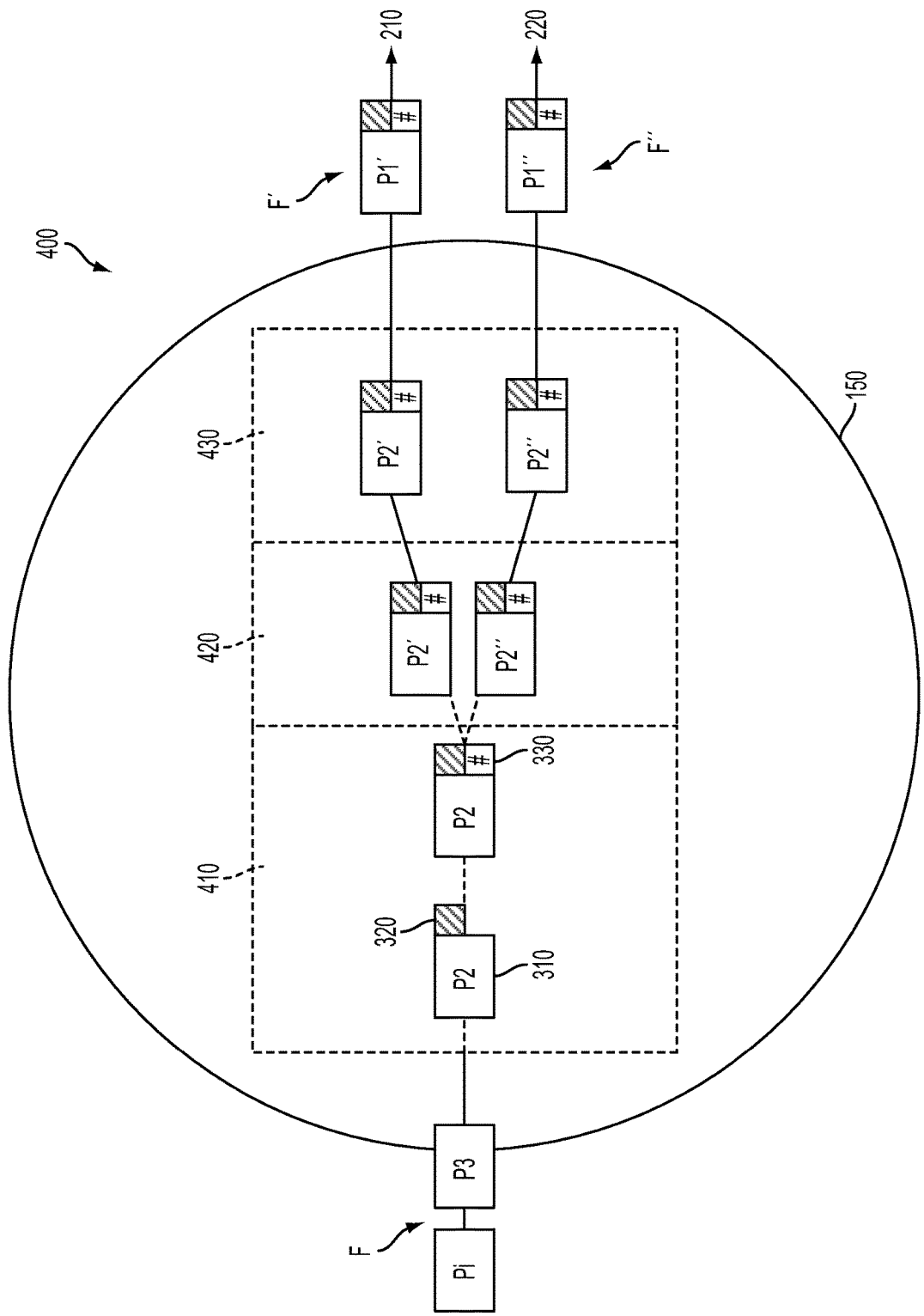
FIG. 4 is a schematic diagram showing of an example of a main flow of data packets in an ingress node, in accordance with an embodiment.

FIG. 4 is a schematic diagram showing an example 400 of the main flow F of data packets Pi being processed by the ingress node 150, in accordance with an embodiment of the methods and systems disclosed herein. In this embodiment, the ingress node 150 is configured to receive input data and to transmit output data sequentially over time. The input data is the main flow F of data packets Pi having the payload data 310 and the output data is the two transit flows F' and F''', for instance. According to the methods and systems disclosed herein, the ingress node 150 is configured to perform actions based on instructions prior to outputting the output data. In the embodiment of FIG. 4, the ingress node 150 is configured to perform first forwarding instructions. In an embodiment, such first forwarding instructions can be stored on a memory of the ingress node 150. In another embodiment, the first forwarding instructions are installed on a memory of the ingress node 150 by the network controller 110 using a computer software product adapted accordingly.

The first forwarding instructions can include an identification action 410, a replication action 420 and a forwarding action 430, for instance. In an alternate embodiment, the sequence data can already be present with the payload data when the data packets arrive at the ingress node, and the step of identification can thus be avoided. In some embodiments, the data can arrive at the ingress node in the form of a steady data stream and/or be stored fully or partially with the ingress node, and the ingress node can additionally perform separating and/or buffering functions to prepare the sending of the data in the form of data packets. In the embodiment of FIG. 4, it is the ingress node 150 which is configured to perform the identification action 410 which identifies each one of the data packets Pi of the main flow F. According to this embodiment, the identification can include incorporating the destination data 320 and the sequence data 330 to the payload data 310 of the data packet Pi. In another embodiment, the identification action 410 is optional and each one of the data packets Pi of the main flow F is identified with the destination data 320 and the sequence data 330 prior to being transmitted to the ingress node 150. In another embodiment, the ingress node 150 is configured to incorporate the network path data 340 to each one of the data packets of a given one of the two transit flows F' and F". In this specific embodiment, the network path data 340 is different for the transit flow F' and for the transit flow F", since the two transit flows F' and F" are to be forwarded along two different network paths. As shown in FIG. 4, the ingress node 150 is configured to perform the replication action 420 which replicates, sequentially over time, the data packets Pi of the main flow F to form the two transit flows F' and F" of data packets Pi having the destination data 320 and the sequence data 330. Also shown in FIG. 4, the ingress node 150 is configured to forward the transit flows F' and F" along intermediate nodes 160 (shown at least in FIG. 2) of the packet-switched network 140 via the two different network paths 210 and 220, for instance. Still referring to FIG. 4, it is noted that although the data packet P2 is being processed by the ingress node 150 upon successive actions 410, 420, and 430 in this embodiment, more than one data packet Pi can be continuously processed by each one of the successive actions 410, 420 and 430 performed by the ingress node 150, for instance.

In another embodiment, the identification action 410 is performed by the data source 120 instead of being performed by the ingress node 150. In this specific embodiment, the destination data 320 and the sequence data 330 are incorporated to the payload 310 of the data packet Pi by the data source 120, prior to transmission of the main flow F of data packet Pi to the ingress node 150. Still in this embodiment, the ingress node 150 performs only the replication action 420 and the forwarding action 430 on each one of the data packets Pi to form the transit flows F' and F", for instance.

Figure 5:
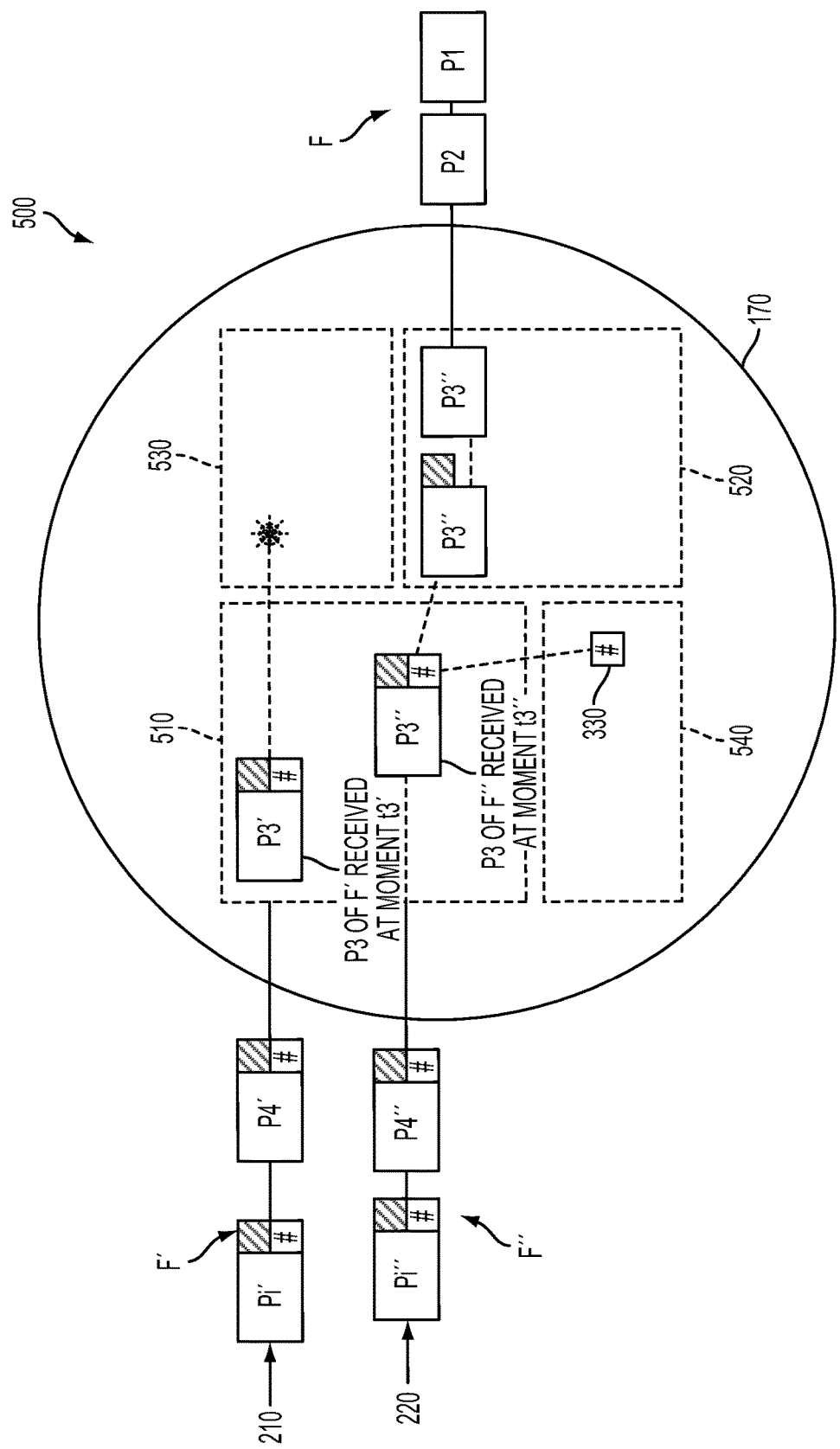
FIG. 5 is a schematic diagram showing an example flow of data packets in an egress node, in accordance with an embodiment.

FIG. 5 is a schematic diagram showing an example 500 of the main flow F of data packets Pi being processed by the egress node 170, in accordance with an embodiment of the methods and systems disclosed herein. In this embodiment, the egress node 170 is configured to receive input data and to transmit output data sequentially over time. The input data are the two transit flows F' and F" transmitted from the ingress node 150 and along the two different network paths 210 and 220. The output data of the egress node 170 is the main flow F of data packets Pi having the payload data 310. In the embodiment of FIG. 5, the egress node 170 is configured to perform second forwarding instructions. In an embodiment, such second forwarding instructions can be stored on a memory of the egress node 170. In another embodiment, the second forwarding instructions are installed on a memory of the egress node 170 by the network controller 110 using a computer software product adapted accordingly.

The second forwarding instructions can include at least a tracking action 510, a forwarding action 520, a deletion action 530 and a storing action 540, for instance. As depicted in FIG. 5, the egress node 170 is configured to perform the tracking action 510 which identifies and tracks each one of the data packets Pi of the transit flows F' and F". In one embodiment, the egress node 170 tracks received data packets Pi from the two transit flows F' and F" and associate a moment ti to each one of the received data packets Pi. According to this embodiment, the egress node 170 is adapted to perform the forwarding action 520 based on the moment ti associated to each of the received data packets Pi of the transit flows F' and F". For instance, when data packet P3 of transit flow F' is received at moment t3' and that data packet P3 of transit flow F" is received at moment t3" which happens to be prior to moment t3', the egress node 170 is configured to forward the data packet P3 of the transit flow F" to the data destination 130. As for the data packet P3 of transit flow F', the egress node 170 is configured to delete the later-received data packet P3 under the deletion action 530 once any of the data packets P3 of any of the transit flows has already been forwarded to the data destination 130.

In another embodiment, the egress node 170 tracks the received data packets Pi from the two transit flows F' and F" and compares the sequence data 330 of the data packets Pi prior to forwarding the data packets Pi to the data destination 130. In this embodiment, the egress node 170 perform the storing action 540 and stores a stored sequence data of each one of the received data packets. The comparison includes comparing the sequence data 330 of the received data packet to the stored sequence data prior to forwarding the data packet Pi upon determining that determining that the sequence data 330 of the received data packet Pi does not correspond to the stored sequence data of the at least one previously received data packet. In other words, the egress node 170 keeps records of the received sequence data 330 associated with the received data packets Pi so that when a given data packet having a sequence data which has already been received, e.g. where the sequence data is already stored in the stored sequence data, the egress node 170 is adapted to delete the given data packet. Alternatively, when a given data packet having a sequence data which has not been previously received according to the stored sequence data, the egress node 170 is adapted to forward the given data packet to the data destination 130. Still in this embodiment, the egress node 170 is adapted to delete the stored sequence data associated with a given sequence data when it is determined that the given sequence data of the received data packet corresponds to the stored sequence data of any one of the previously received data packets. Put differently, the stored sequence data stored by the egress node 170 can be updated in real-time to limit the system requirements, for instance.

In an embodiment, the storing action 540 stores the sequence data 330 of the data packets of the transit flows F' and F" in a memory of the egress node 170. In the embodiment depicted in FIG. 5, the sequence data 330 of data packet P3 of transit flow F" is stored at moment t3" so that, upon reception of the data packet P3 of transit flow F' at a later moment t3', it is determined by the egress node 170 that the later-received data packet P3 of transit flow F' should be deleted under the deleting action 530. Moreover, in this embodiment, the forwarding action 520 removes the sequence data 330 and the destination data 320 from the data packet Pi prior to forwarding the payload 310 of the data packet Pi to the data destination 130. In another embodiment, the data packet Pi is forwarded along its destination data 320 and its sequence data 330, for instance. In another embodiment, the egress node 170 is configured to store data packet Pi for a duration of time. This storing can be useful when re-ordering of the data packets Pi, i.e. when a subsequent data packet is received prior to a previous data packet. In this situation, the egress node 170 is adapted to store the subsequent data packet in order to forward it to the data destination 130 according with the sequence of the sequence data of the main flow F of data packets Pi.

In another embodiment, the forwarding action 520 does not remove the destination data 320 and the sequence data 330 from each one of the forwarded data packets Pi. In this specific embodiment, the forwarded data packets Pi include the payload 310, the destination data 320 and the sequence data 330. Still in this embodiment, the data destination 130 is configured to process the payload 310 of each one of the data packets Pi of "reconstructed" main flow F based on their respective sequence data 330, for instance.

Figure 6:
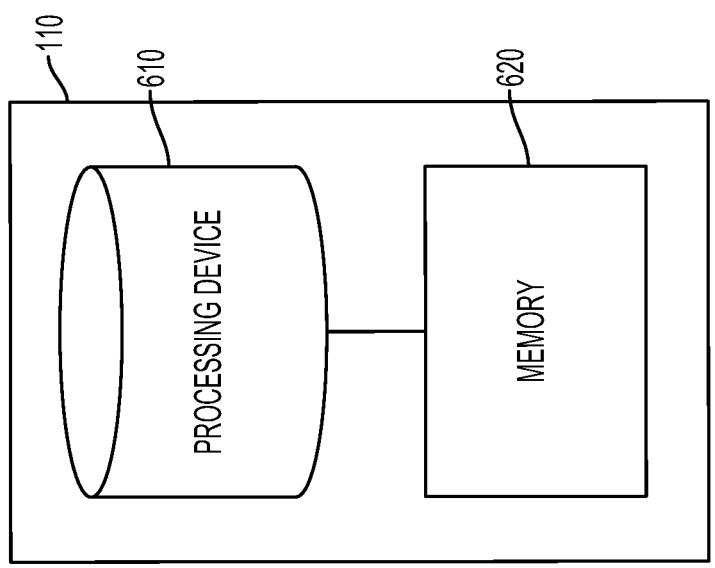
FIG. 6 is a high-level schematic diagram of an example of a network controller of the network communication system of FIG. 1, in accordance with an embodiment.

FIG. 6 illustrates a high-level schematic diagram of an example of the network controller 110. As shown, the network controller 110 includes a processing device 610 connected to a memory 620.

Figure 7:
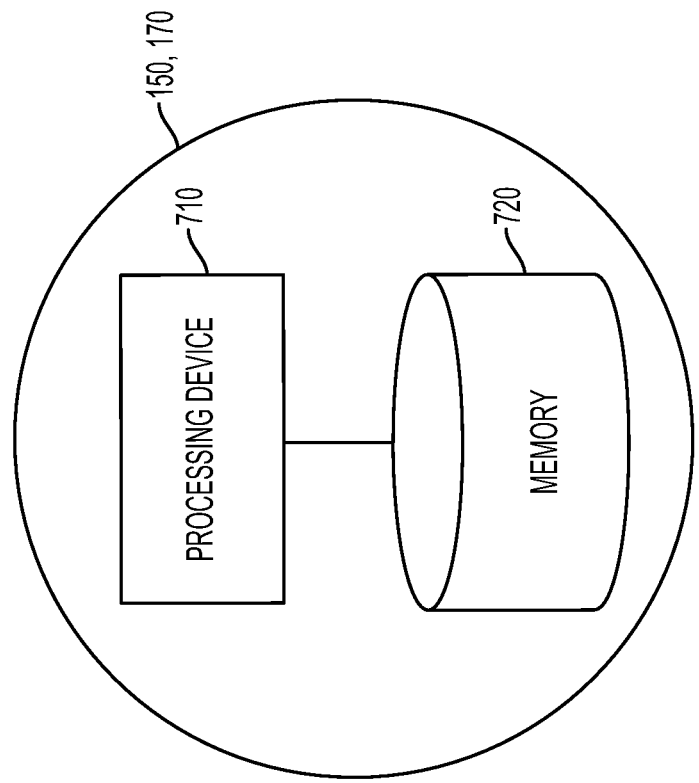
FIG. 7 is a high-level schematic diagram of an example of a node of the network communication system of FIG. 1, in accordance with an embodiment.

FIG. 7 illustrates a high-level schematic diagram of an example of any of the ingress node 150 and the egress node 170. As depicted, the nodes 150 and 170 include a processing device 710 and a memory 720 operatively connected to the processing device 710.

In an embodiment, the network controller 110 can perform the first forwarding instructions and the second forwarding instructions using, respectively, the ingress node 150 and the egress node 170. In this specific embodiment, streaming of a main flow F of data packets Pi is managed by a computer software product stored on the memory 620 of the network controller 110. In another embodiment, the computer software product contains computer code for installing the first forwarding instructions on the memory 720 of the ingress node 150 and for installing the second forwarding instructions on the memory 720 of the ingress node 170. Once the first and the second forwarding instructions installed on the memory 720 of either one of the nodes 150 and 170, the processing device 710 is adapted to perform each one of the forwarding instructions in accordance with the methods disclosed herein. In an embodiment, the network controller 110 is sold having the computer software product programmed on the memory 620, the ingress node 150 is sold as a standalone device having the first forwarding instructions on the memory 720 of the ingress node 150 and the egress node 170 is sold as a standalone device having the second forwarding instructions on the memory 720 of the egress node 170.

In an embodiment, the network controller 110 is operatively coupled to the ingress node 150 and to the egress node 170 via the network 140. In an embodiment, the SDN controller 110 is further configured to generate network paths which can be used by the ingress node 150. The memory 620 of the network controller 110 can be populated with data relating to the topology and operating characteristics of the network communication system 100, and more particularly, of the packet-switched network 140. For instance, the memory 620 can include records identifying each of the data sources 120, each of the nodes 150, 160, and 170 and each of the data destinations 130, records identifying each of the links interconnecting the nodes, records identifying each of the possible source routes among the packet-switched network 140 and records identifying each of the transmission delays associated with the possible source routes.

In another embodiment, at least some of the data stored in memory 620 of the network controller 110 may be accessed prior to operation of network controller 110. The memory 620 of the network controller 110 may be updated by the topology and operating characteristics of network 140 change, e.g., as new nodes or links are added or upgraded, or as nodes or links are removed or failed. Updates regarding changing network conditions may be received from the nodes, or from dedicated monitors (not shown) connected to network 140. In an embodiment, the network database 400 may be updated in real-time or near real-time.

The network controller 110 may, e.g., be an OpenDaylight SDN controller, an Open Network Operating System (ONOS) SDN controller, or the like. Network controller 110 may communicate with nodes of system 100, e.g., data sources 120 and nodes 150, 160 and 170 according to the OpenFlow™ protocol and/or the Protocol-Oblivious Forwarding (POF) protocol. The network controller 110 can also perform various other control plane functions, including network configuration, network monitoring, etc., for network 140.

In the depicted embodiment, the nodes 150 and 170 are programmable by the network controller 110 so that they can be configured to transmit, receive and/or forward information over the packet-switched network 140. For instance, the nodes 150, 160, and 170 can be SDN data communication equipment (DCE) such as switches, modems, hubs or bridges, SDN data terminal equipment (DTE) such as a routers, workstations or servers and/or a combination thereof.

Figure 8:
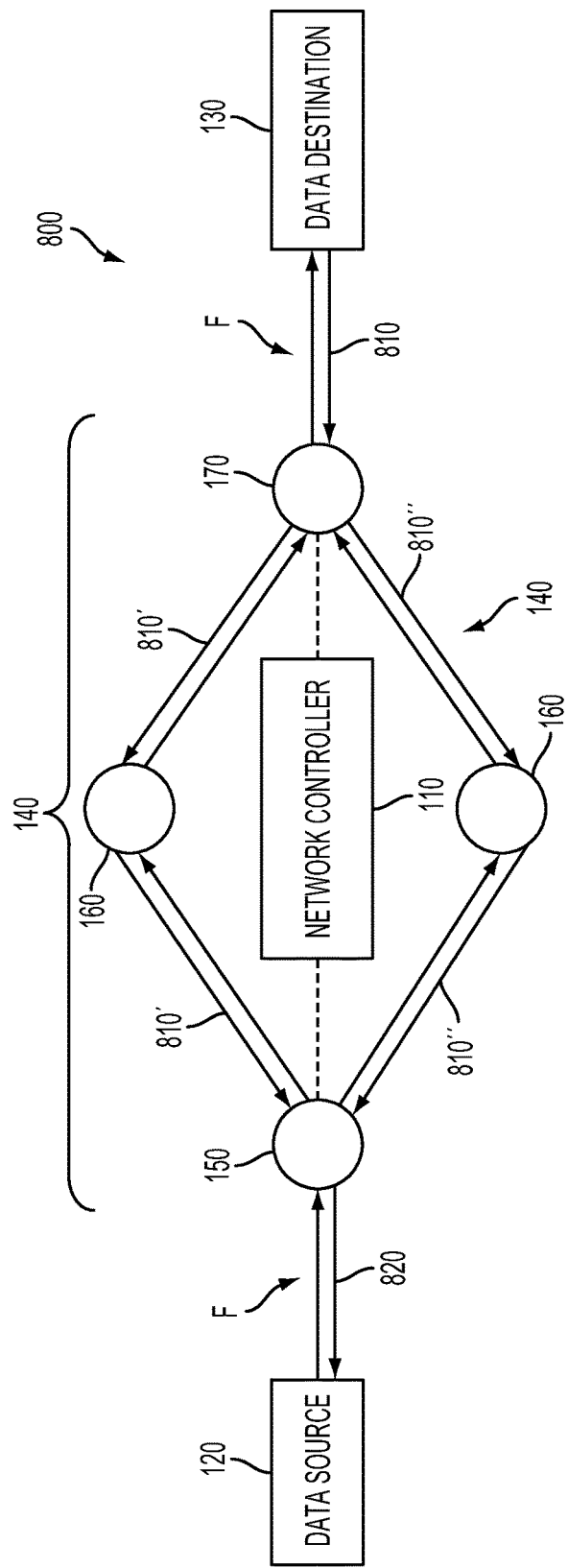
FIG. 8 is a schematic diagram showing a first example of a main flow of data packets in the network communication system of FIG. 1, in accordance with an embodiment.

FIG. 8 is a schematic diagram showing a first example 800 of a main flow F of data packets Pi in the network communication system 100, in accordance with an embodiment which involves TCP transport. TCP streams are known to be bi-directional such that information flows not only from the data source 120 to the data destination 130 but also from the data destination 130 to the data source 120. In this embodiment, the main flow F is transmitted from the data source 120 to the data destination 130 while flow traffic data 810 is transmitted from the data destination 130 to the data source 120. In an embodiment, the flow traffic data 810 contains at least acknowledgement data indicative of which of the data packets Pi of the main flow F have been transmitted successfully to the data destination 130, for instance. In the embodiment depicted in FIG. 8, the traffic flow data 810 is transmitted from the data destination 130 to the egress node 170, where the traffic flow data 810 is replicated to form transit traffic flow data 810' and 810". Each of the traffic flow data 810' and 810' is transmitted backwards along the network paths of, respectively, transit flows F' and F". In an embodiment, such transmission of the traffic flow data 810 is included in the second forwarding instructions to be performed by the egress node 170. Moreover, in another embodiment, the transit traffic flow data 810' and 810" are to be received and combined by the ingress node 150 prior to be transmitted in the form of the traffic flow data 820 to the data source 120. In any event, the traffic flow data 820 can cause the data source 120 to retransmit any of the data packets Pi of the main flow F.

Figure 9:
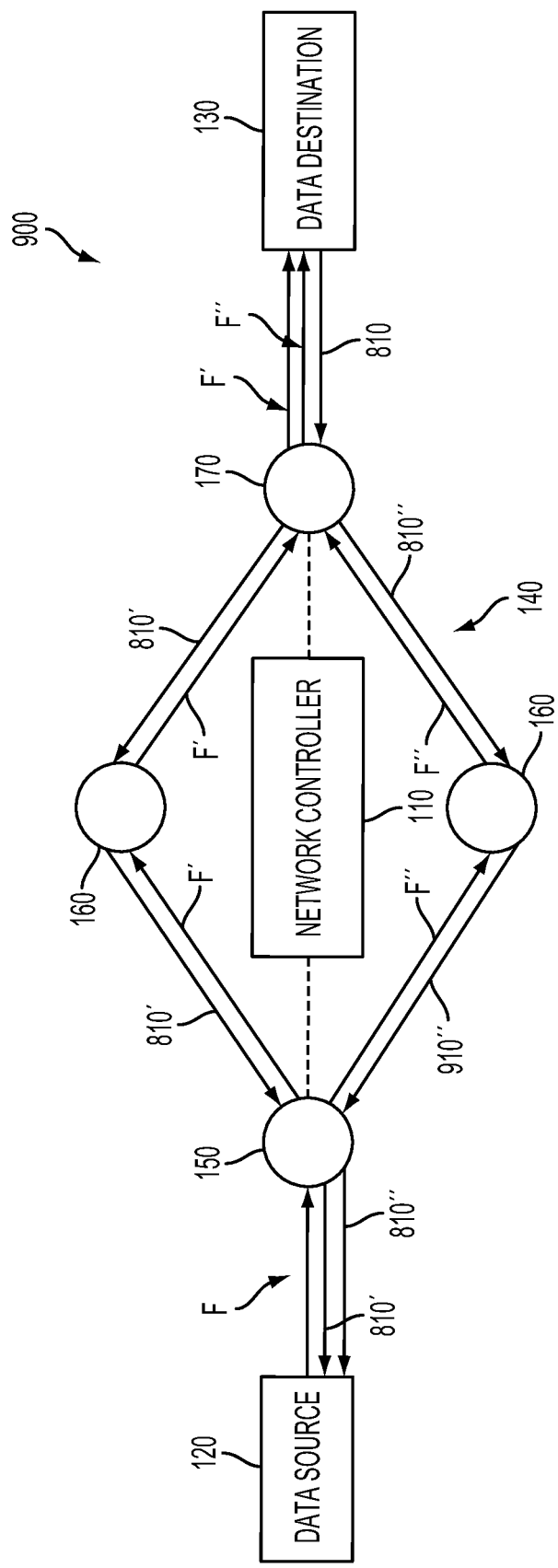
FIG. 9 is a schematic diagram showing a second example of a main flow of data packets in the network communication system of FIG. 1, in accordance with an embodiment.

FIG. 9 is a schematic diagram showing a second example 900 of a main flow F of data packets Pi in the network communication system 100, in accordance with an embodiment which involves TCP. In this depicted embodiment, the data destination 130 is configured to perform the actions of the second forwarding instructions in accordance with the methods and systems described above. Indeed, in this embodiment, the two transit flows F' and F" are transmitted, from the egress node 170, directly to the data destination 130, which can be a data processing destination. In another embodiment depicted in FIG. 9, the ingress node 150 forwards the transit traffic flow data 810' and 810" directly to the data source 120 without combination thereof. In another embodiment, the traffic flow data are indicative of the traffic upon any one of the network paths of the transit flows F' and F". In this specific embodiment, the traffic flow data 810 is used to reroute any one of the transit flows upon administrative and/or operational reasons relating to the network 140.

Figure 10A:
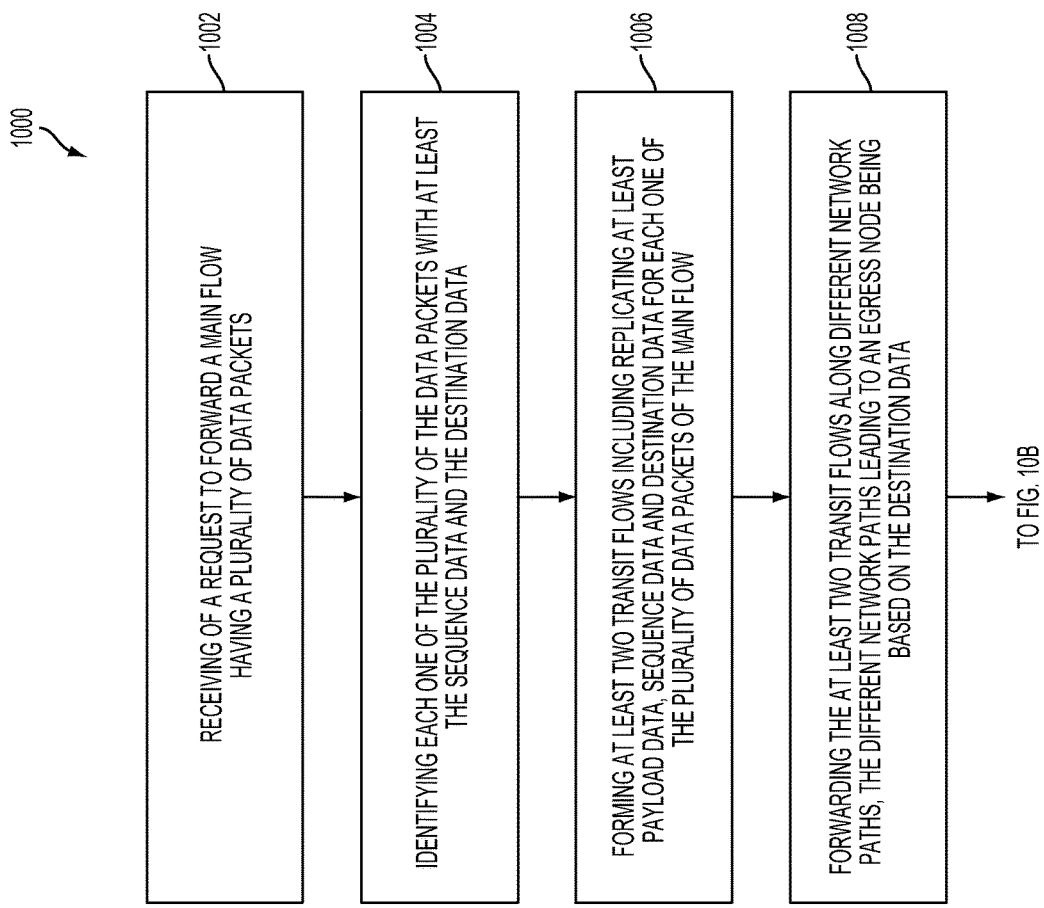
FIGS. 10A-B are flowcharts of an example of a method for forwarding a plurality of data packets associated with a main flow in the network communication system of FIG. 1, in accordance with an embodiment.
Figure 10B:
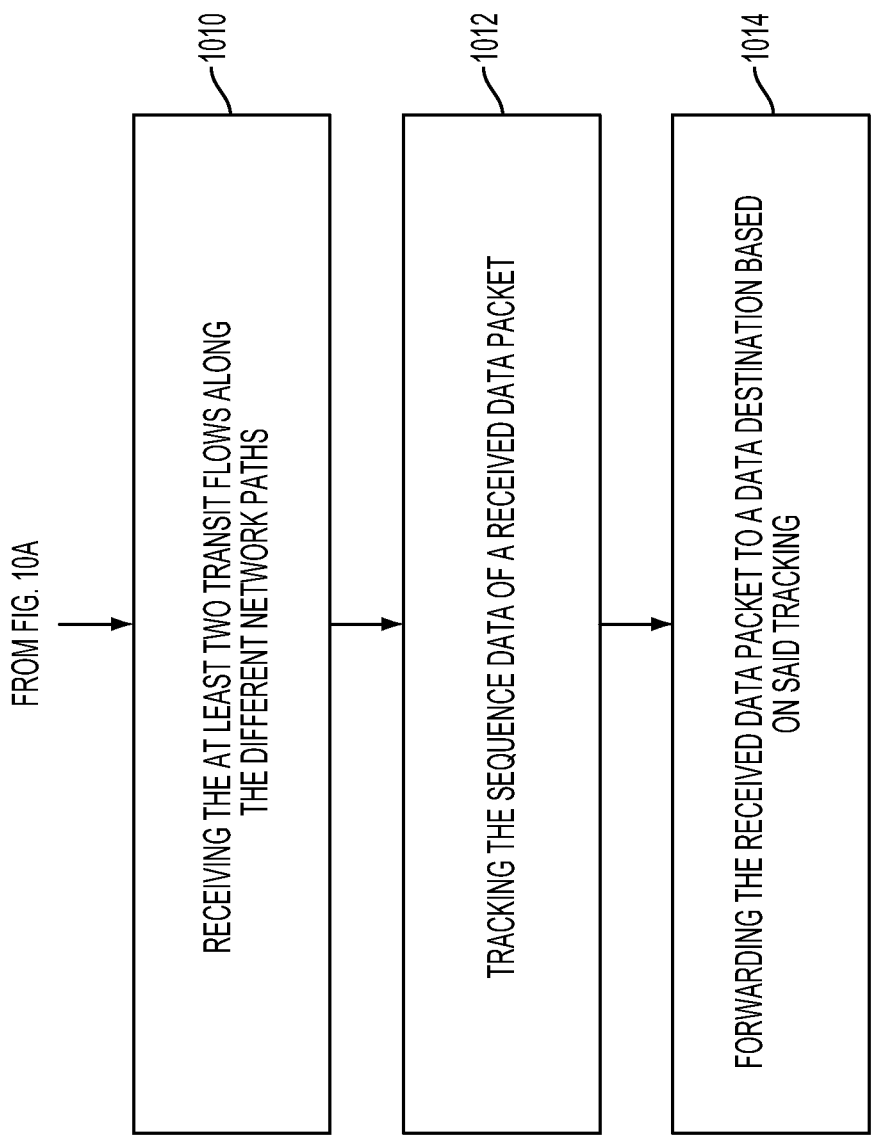

FIGS. 10A-B are flowcharts of an example of a method 1000 for forwarding a plurality of data packets associated with a main flow F in the network communication system 100, in accordance with an embodiment. Referring to FIG. 10A, the exemplary method 1000 comprises a step 1002 of receiving a request to forward a main flow F having a plurality of data packets Pi from a data destination 120. Once streaming of the main flow F is initiated, the method includes a step 1004 of identifying each one of the data packets Pi with at least the sequence data 330 and the destination data 320. Then, the method includes a step 1006 of forming at least two transit flows by replicating at least payload data 310, the sequence data 330 and the destination data 330 for each one of the data packets Pi of the main flow F followed by a step 1008 of forwarding the at least two transit flows along different network paths which each leads to the egress node based on the destination data 320. The method 1000 can be performed by the processing device 710 of the ingress node 150 or by the processing device 610 of the network controller 110. Hereinabove, the steps 1004, 1006 and 1008 are referred to as the first forwarding instructions which are to be performed prior to transmission of the main flow F in the network 140, for instance.

Further, FIG. 10B is a flowchart of the exemplary the method 1000 for forwarding a plurality of data packets Pi associated with a main flow F in the network communication system 100, in accordance with an embodiment. Steps 1010, 1012 and 1014 are referred to as the second forwarding instructions which are to be performed upon reception of the at least two transit flows of data packets Pi and prior to transmission of reconstructed main flow F to the data destination 120. More specifically, the method includes the step 1010 of receiving the at least two transit flows along the different network paths, the step 1012 of tracking the sequence data 330 of a received data packet and the step 1014 of forwarding the received data packet to the data destination 120 based on said tracking.

In an embodiment, the first forwarding instructions are provided in the form of a first identification table and of a replication table and the second forwarding instructions are provided in the form of a second identification table and a transit flow combination table. Such tables, when installed on the memories 720 of the nodes 150 and 170 can be accessed quickly by the processing device 710 so as to perform the forwarding instructions in accordance with the methods described herein.

In the depicted embodiment, the network 140 is an Ethernet network including a plurality of wired links. However, in another embodiment, network 140 can be another type of the packet-switched network 140 such as a frame relay network, an Asynchronous Transfer Mode (ATM) network, a general packet radio service (GPRS) network, or the like, and may include a plurality of wired links, wireless links, or a combination thereof.

Embodiments disclosed herein may be implemented by using hardware, by using software and a combination thereof. Based on such understandings, the technical solution may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments.

Program code is applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

Numerous references will be made regarding servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory, display, networks particularly configured to implement various acts. The embodiments described herein are directed to electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, a various hardware components.

As can be understood, the examples described above and illustrated are intended to be exemplary only. For instance, the different network paths can be encrypted and/or multiplexed at the data source and forwarded along the same network path of the network while the decryption and/or demultiplexing can be performed at the data destination. The scope is indicated by the appended claims.

What is claimed is:

1. A method for forwarding a data packet in a network having at least a programmable ingress node, the method comprising the steps of:
    the programmable ingress node forming at least two transit data packets including replicating at least payload data, sequence data and destination data of the data packet;
    the programmable ingress node incorporating first network path data to a first one of the at least two transit data packets and second network path data to a second one of the at least two transit data packets, the first network path data representing a first defined network path from the ingress node to an egress node through the network, the second network path data representing a second defined network path from the ingress node to the egress node through the network;
    the programmable ingress node transmitting the first of the at least two transit data packets along the first defined network path to the egress node selected in accordance with the destination data; and
    the programmable ingress node transmitting the second of the at least two transit data packets along the second defined network path to the egress node, the second defined network path being different than the first defined network path.

2. The method of claim 1, further comprising, prior to said forming and forwarding, the programmable ingress node identifying the data packet with at least the sequence data and the destination data.

3. The method of claim 1, wherein the egress node is a programmable egress node, the method further comprising:
    the programmable egress node tracking the sequence data of a received data packet; and
    the programmable egress node forwarding the received data packet to a data destination based on said tracking.

4. The method of claim 3, further comprising:
    tracking includes the programmable egress node comparing the sequence data of the received data packet to a stored sequence data of at least one previously received data packet;
    wherein said forwarding is performed upon determining that the sequence data of the received data packet does not correspond to the stored sequence data of the at least one previously received data packet.

5. The method of claim 4, further comprising the programmable egress node deleting the stored sequence data associated with a given sequence data upon determining that the given sequence data of the received data packet corresponds to the stored sequence data of the at least one previously received data packet.

6. The method of claim 4, further comprising the programmable egress node storing the sequence data on at least one of the memory of the egress node and the memory of a network controller upon determining that the sequence data of the received data packet does not correspond to the stored sequence data of the at least one previously received data packet.

7. The method of claim 1, wherein the network is a software-defined network (SDN) comprising a plurality of programmable network nodes, the programmable ingress node being one of the plurality of programmable network nodes.

8. The method of claim 7 wherein the steps of forming, transmitting the first packet and transmitting the second packet are performed in accordance with instructions received from an SDN controller.

9. The method of claim 8 wherein the first defined network path and the second defined network path are specified by the SDN controller.

10. The method of claim 7, wherein the plurality of programmable network nodes are Protocol-Oblivious Forwarding (POF) switches.

11. The method of claim 1, wherein the destination data involves at least one of a custom protocol, a Real-time Transport Protocol (RTP) and a Transmission Control Protocol (TCP).

12. A programmable ingress node for forwarding a data packet in a network having a plurality of nodes including an egress node coupled to a data destination outside the network, the programmable ingress node for operative connection to a data source outside the network and for connection to the egress node through the network, the programmable ingress node comprising:
    a processing device; and
    a memory operatively coupled to the processing device and having stored thereon forwarding instructions that, when executed by the processing device, cause the programmable ingress node to:
        form at least two transit data packets including replicating at least payload data, sequence data and destination data of the data packet;
        incorporate first network path data to a first one of the at least two transit data packets and second network path data to a second one of the at least two transit data packets, the first network path data representing a first defined network path from the ingress node to an egress node through the network, the second network path data representing a second defined network path from the ingress node to the egress node through the network;
        transmit the first of the at least two transit data packets along the first defined network path to the egress node selected in accordance with the destination data; and
        transmit the second of the at least two transit data packets along the second defined network path to the egress node, the second defined network path being different than the first defined network path.

13. The programmable ingress node of claim 12, wherein said forwarding includes the programmable ingress node incorporating a different network path data to each one of the transit data packets, the network path data of each one of the at least two transit data packets being associated with the different network paths.

14. The programmable ingress node of claim 12, wherein the network is a software-defined network (SDN).

15. The programmable ingress node of claim 14, wherein the programmable ingress node is a SDN switch.

16. The programmable ingress node of claim 15, wherein the SDN switch is at least one of OpenFlow switch and a Protocol-Oblivious Forwarding (POF) switch.

17. The programmable ingress node of claim 12, wherein the destination data involves at least one of a custom protocol, a Real-time Transport Protocol (RTP) and a Transmission Control Protocol (TCP).

18. The method of claim 1, wherein at least one of the first network defined path and the second network defined path comprises at least two intermediate nodes between the ingress node and the egress node.

19. The programmable ingress node of claim 12, wherein at least one of the first network defined path and the second network defined path comprises at least two intermediate nodes between the ingress node and the egress node.

\* \* \* \* \*